United States Patent Office 3,830,775
Patented Aug. 20, 1974

3,830,775
PRODUCTION OF AROMATIC POLYESTERS OF
IMPROVED COLOUR
Warren Hewertson, Runcorn, England, assignor to
Imperial Chemical Industries Limited, London, England
No Drawing. Filed Nov. 17, 1969, Ser. No. 877,503
Claims priority, application Great Britain, Dec. 3, 1968,
57,269/68
Int. Cl. C08f 21/04; C08g 17/013, 17/015
U.S. Cl. 260—22 CA                              16 Claims

ABSTRACT OF THE DISCLOSURE

In a process for the preparation of highly polymeric polymer by the polycondensation of polymerizable material at least 85 mole percent of which consists of at least one bis ethylene glycol ester of an aromatic dicarboxylic acid, especially terephthalic acid, the greyness in the polymeric product normally associated with the use of conventional antimonial polycondensation catalysts is reduced by using as the catalyst a trihalide or tri(pseudohalide) of antimony and an organic oxo compound of a Group Va element other than nitrogen, especially phosphorus or arsenic.

---

This invention relates to a method of improving the colour of highly polymeric polyesters which have been obtained from polycondensations involving the use of antimony-containing polycondensation catalysts.

Highly polymeric polyesters of ethylene glycol and aromatic dicarboxylic acids, by which we mean dicarboxylic acids wherein each —COOH group is attached to a carbon atom which forms part of an aromatic carbocyclic ring, are known to be useful thermoplastic materials. Two which may be mentioned in particular are those from terephthalic acid and 1,2-di(p-carboxyphenoxy)ethane.

Highly polymeric poly(ethylene terephthalate), for example, is a thermoplastic having a very desirable combination of physical and chemical properties and is produced in large tonnages for conversion to filament, fibre and film. More recently, compositions based on it have been announced for general thermoplastic moulding, e.g. injection-moulding, applications.

For many applications, and particularly for use in fibre or filament form in textiles, for use in thermoplastic moulding applications or for use in films, it is highly desirable that these polyesters be as free from discolouration as possible.

Many processes have been proposed for the production of these polyesters and the process have involved a variety of starting materials. In general, however, all the processes proceed via the formation of a bis ethylene glycol ester of the aromatic dicarboxylic acid and the polycondensation of this intermediate to highly polymeric polyester with loss of ethylene glycol. The bis glycol ester may be formed, for example, by reaction of the aromatic dicarboxylic acid or of an ester-forming derivative thereof, e.g. a dialkyl ester, with ethylene glycol, or by the reaction of the aromatic dicarboxylic acid with ethylene oxide or with ethylene carbonate.

Both the process of forming the bis glycol ester and the polycondensation thereof to highly polymeric polyester may be facilitated by the action of catalysts, and in accordance with one preferred and widely used method of effecting the polycondensation, catalysis is provided by compounds of trivalent antimony. The use of these compounds, however, has tended to produce polymer which is discoloured by a greyish tinge which is thought to be due to residual finely divided antimony metal in the polymer. This grey discolouration is not to be confused with the yellowing which has also been observed in these highly polymeric polyesters, and which is generally believed to be due to thermal degradation of the polymer promoted by residues of the catalyst used in the formation of the bis glycol ester. Furthermore, the remedies proposed in the past for inhibiting the yellowing do not seem to provide an answer to the greying referred to. For example, the phosphorus-based additives popularly used for reducing the yellowing, e.g. phosphorus acid and organic phosphites appear if anything to promote the grey discoloration, especially when used in conjunction with antimony trioxide.

We have now found that this tendency to a grey discolouration associated with the use of antimony compounds may be reduced by using as the polycondensation catalyst an antimony trihalide or tri(pseudohalide) and an organic oxo compound of a Group Va element having an atomic number greater than 7.

So as not to modify, dilute or lose the highly desirable properties of the polyesters of ethylene glycol and aromatic dicarboxylic acids it is usually preferred that the polycondensable material consists substantially entirely of one or more bis ethylene glycol esters of aromatic dicarboxylic acids. However, the presence of a small concentration of other polycondensable material may be tolerated, if desired, for example to improve dyeability. For example, up to about 5 mole percent of the ethylene glycol moiety in the bis glycol ester or esters may be replaced by at least one other polycondensable dihydroxy compound and/or up to about 5 mole percent of the aromatic dicarboxylic acid moiety may be replaced by at least one another dicarboxylic acid. Up to about 5 mole percent of the polycondensable mixture may also consist of other mono- or polyfunctional material, if desired; e.g. alcohols and/or their esters with the dicarboxylic acids, amines and/or diamines and/or their amides with the dicarboxylic acids, aminoalcohols and/or their condensation products with the dicarboxylic acids, and/or amino acids, hydroxy acids, lactams and/or lactones and/or their condensation products with the dicarboxylic acids and/or glycols. However, it is usually preferred that at least 85 mole percent, and preferably at least 95 mole percent, of the polycondensable mixture consists of bis ethylene glycol ester of aromatic dicarboxylic acid.

Thus, according to the present invention we provide a process for the production of highly polymeric polymer by the polycondensation of polycondensable material at least 85 mole percent of which consists of at least one bis ethylene glycol ester of an aromatic dicarboxylic acid in which said polycondensation is effected in the presence as catalyst of (i) a trihalide or tri(pseudohalide) of antimony, and
(ii) an organic oxo compound of an element of Group Va of the Periodic Table shown inside the back cover of the 45th edition of the Handbook of Chemistry and Physics published by the Chemical Rubber Co., said element having an atomic number greater than 7 and being phosphorus, arsenic, antimony or bismuth.

While the process of our invention is applicable in general to the production of polyesters of ethylene glycol and any aromatic dicarboxylic acid, it is especially suitable for use in the production of highly polymeric poly-(ethylene terephthalate) from the bis ethylene glycol ester of terephthalic acid since the colour of this polyester is of special importance in assessing its potential suitability for commercial applications. Examples of other aromatic dicarboxylic acids whose bis ethylene glycol esters may be converted to high polymer by the process of this invention include isophthalic acid, dicarboxydiphenyls, naphthalene dicarboxylic acids, and compounds containing two carboxyphenyl groups linked by a divalent bridging group which may be for example, alkylene, alkylene dioxy e.g.

—OCH$_2$CH$_2$O—, —O—, —S—, —SO$_2$— or —CO—. Mixtures of bis ethylene glycol esters of aromatic dicarboxylic acids may also be used.

As is well known, oxo compounds are compounds characterised by containing at least one oxygen atom which is bound to only one other atom and for the purposes of this specification an organic oxo compound of a Group V$a$ element is to be understood to mean a compound wherein the atom to which the oxygen is bound is an atom of a Group V$a$ element in its pentavalent state, and wherein one of the three remaining valencies of the atom of the Group V$a$ element is satisfied by a carbon atom or an oxygen atom the other free valency of which is satisfied by a carbon atom, and each of the remaining two valencies is satisfied by a carbon atom, and oxygen atom the other free valency of which is satisfied by a carbon atom, or a further atom of a Group V$a$ element.

Examples of our specified organic oxo compounds are those having the structure

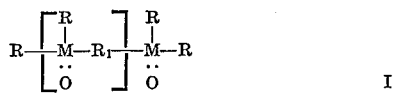

I where M is a Group V$a$ element having an atomic number greater than 7, each R is a monovalent hydrocarbyl group or a monovalent hydrocarbyloxy group preferably containing not more than 8 carbon atoms, each R$_1$ is a direct link or a divalent hydrocarbon group preferably containing not more than 2 carbons in the chain linking the M atoms and not more than 14 carbon atoms in all, and $n$ is zero or a positive whole number which is generally one.

When $n$ is zero in the structure I above, compounds having the structure II may be obtained.

II where M is preferably phosphorus but may also be arsenic, for example, and each R is selected from alkyl, aralkyl, aryl, alkaryl, alkoxy, alkaryloxy, aryloxy and aralkyloxy where alk(yl) includes cycloalk(yl), especially methyl, ethyl, isomeric propyl, isomeric butyl, phenyl, methoxy, ethoxy, isomeric propoxy, isomeric butoxy and phenoxy.

Examples are trialkyl phosphine and arsine oxides, triaryl phosphine and arsine oxides, alkyl diaryl phosphine and arsine oxides, aryl dialkyl phosphine and arsine oxides, and trialkyl, triaryl, alkyl diaryl and aryl dialkylphosphates, -phosphonates and -phosphinates. (The term alkyl as used herein also includes cycloalkyl and aralkyl, and the term aryl includes alkaryl).

All the R's may be identical, if desired, and representative examples are trimethyl phosphine oxide, triphenyl phosphine oxide, tri-n-butyl phosphine oxide, triphenyl arsine oxide, triphenyl phosphate, trimethyl phosphonate and triphenyl phosphinate. Alternatively, the R's may be different and examples are methyl diphenyl phosphine oxide, the methyl ester of methyl phenyl phosphinic acid, trimethyl phosphinate and triphenylphosphinate.

In the case where $n$ is 1, compounds having the structure

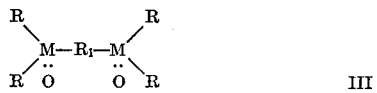

III may be obtained where each R is selected from alkyl, aralkyl, aryl, alkaryl, alkoxy, alkaryloxy, aryloxy and aralkyloxy where alk(yl) includes cycloalk(yl); especially methyl, ethyl, isomeric propyl, isomeric butyl, phenyl, methoxy, ethoxy, isomeric propoxy, isomeric butoxy and phenoxy and R$_1$ is a direct link or a divalent hydrocarbon group preferably having not more than 2 carbon atoms in the chain linking the M atoms and not more than 14 carbon atoms in all. Compounds having this structure are the much preferred compounds for use in the catalyst compositions utilised in our invention. In these compounds, R$_1$ is preferably a direct link or a divalent hydrocarbon group, —CH$_2$— or —CH$_2$CH$_2$—, and M is preferably phosphorus or arsenic.

Representative of these compounds are:

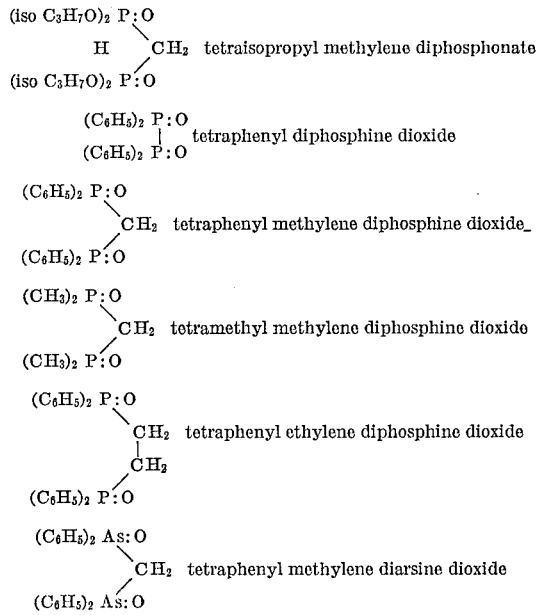

While the R's are all identical in the compounds listed above, it is to be understood that those wherein the R's are different are also suitable for use in the process of our invention.

The antimony compound is preferably a trihalide e.g. antimony trichloride, antimony tribromide or, especially antimony trifluoride. However a tri(pseudohalide), e.g. tricyanide or triisothiocyanate, may also be used.

The amount of antimony compound used will generally be in the range 0.02% to 0.2% by weight of bis glycol ester although amounts as small as 0.008% or up to as great as 0.5% by weight may be used if desired. The organic oxo compound is preferably used in an amount which provides two oxo oxygen atoms for each antimony atom although larger or smaller amounts may be used, if desired. Thus, in the case of oxo compounds having the structure II above, it is preferred to use two moles/mole of antimony compound and in the case of oxo compounds having the structure III above, the preferred amount is one mole/mole of antimony compound.

The two components of our specified catalyst system may be added separately or together at or before the commencement of the reaction. Alternatively, one or both of the components may be injected into the polycondensing system at a later stage, if desired, although some of the advantage of using a catalyst may then be lost. In yet a further alternative, the oxo compound may be added before or during any preliminary reaction to form the bis glycol ester but it is preferred to delay the addition of the antimony compound until this preliminary reaction is complete or nearly so.

The polycondensation, which may be effected batchwise or as a continuous reaction, is preferably effected at a temperature of at least 280° C. in order to achieve desirable rates of reaction, and high vacuum is generally applied in order to aid the removal of glycol by-product. The reaction is usually continued until the desired molecular weight is achieved. The viscosity of the melt provides a measure of molecular weight and the progress of the reaction may be determined by observing the increase in melt viscosity with time.

One method of estimating the effectiveness of our process is with reference to the luminance of the polymeric products, increase in the value of which reflects a reduction in greyness. Luminance is a measure of the proportion of the incident light reflected on examination of the polymer using a "Colormaster" which is the trade name for the differential colorimeter manufactured by Manufacturers Engineering and Equipment Corporation. The luminance may be measured on the as made polymer or on articles, e.g. filaments, fibres, films or moulded articles, fabricated therefrom.

In the case of poly(ethylene terephthalates) in particular, relatively small variations in luminance can be of considerable importance in determining the value of a particular polymer for commercial purposes. It is thus highly desirable, particularly for filament end uses, that the polymer should have a high luminance value. However, luminance values depend to a considerable degree upon the history of formation of the polymer and comparisons of results found in the Examples are only meaningful where the polymers in question were prepared under identical conditions, on the same scale, and in the same equipment.

The invention is now illustrated by the following Examples in which all parts are expressed as parts by weight and all intrinsic viscosity measurements were recorded using solutions of 1 g. of polymer in 100 ml. of o-chlorophenol at 25° C.

EXAMPLE 1

Experiment A

100 Parts of dimethyl terephthalate and 71 parts of ethylene glycol were added cold to a stainless steel vessel which had previously been purged with nitrogen and which was provided with heating means, a stirrer, an offtake for volatile material and a nitrogen inlet and outlet. The mixture was then melted at 120–130° C. under nitrogen and an amount of manganese acetate tetrahydrate equivalent to 0.025 part of anhydrous manganese acetate was added. Gentle heating was then applied and the temperature was gradually raised to 220° C., and the methanol distilled off. When the theoretical amount of methanol had been collected, 0.015 part of phosphorous acid was added and the mixture was transferred under oxygen-free conditions to a stirred polymerisation autoclave. 0.074 Part of antimony trifluoride and 0.5 part of titanium dioxide were then added and the temperature raised to 235° C. Pressure was then reduced to 1 mm. of mercury absolute while the temperature was raised to 290° C. The temperature was then maintained at 290° C. until an adequate melt viscosity had been achieved, and the polymer then extruded and granulated. The polymeric product, intrinsic viscosity 0.71, had a luminance value of 54.

Experiment B

The process was repeated but using only 0.037 part of antimony trifluoride (i.e. about 0.028% by weight based on bis glycol ester assuming 100% conversion of the dimethyl terephthalate) and, in place of the phosphorous acid, 0.063 part of tetraisopropyl methylene diphosphonate. The polymeric product, intrinsic viscosity 0.68, had a luminance value of 75. (The disphosphonate was prepared by the method described in the Journal of the American Chemical Society (1961) Volume 83 at page 1722.)

EXAMPLE 2

The process of Experiment 1B was repeated but using 0.10 part of tetraphenyl methylene diarsine dioxide in place of the diphosphonate. The polymeric product, intrinsic viscosity 0.71, had a luminance value of 77.

To prepare the tetraphenyl methylene diarsine dioxide, triphenylarisine (25 parts) was added to a well-stirred solution of sodium (3.7 parts) in liquid ammonia (425 parts) under nitrogen at 175° C. When the colour of the solution changed from blue to orange, ammonium chloride, (4.28 parts) was added and the reaction mixture was stirred for an hour. Methylene chloride (6.68 parts) was added dropwise until the colour was discharged. After allowing the ammonia to evaporate the solid residue was washed five times with water and then twice with methanol and recrystallised from n-propanol to yield tetraphenyl methylene diarsine as a colourless crystalline solid, melting at 98° C. This diarsine was oxidised with an excess of hydrogen peroxide in acetone and the oil obtained after evaporation of acetone, believed to be an adduct of the dioxide with hydrogen peroxide, was treated with nitric acid (30%). The resulting white solid, $$[(C_6H_5)_2As:O]_2CH_2.2HNO_3$$

was filtered off and dissolved in diluted aqueous ammonia, and the solution was extracted with chloroform. The pale yellow solid obtained after evaporation of the solvent was recrystallised from a methylene chloride/diethyl ether mixture to give the colourless diarsine dioxide, melting point 205–207° C.

EXAMPLE 3

The process of Experiment 1B was repeated but using only 0.019 part of antimony trifluoride and, in place of the diphosphonate, 0.043 part of tetraphenyl methylene diphosphine dioxide. The polymeric product, intrinsic viscosity 0.71, had a luminance value of 67.

The tertaphenyl methylene diphosphine dioxide was prepared as follows: tetraphenyl methylene diphosphine (38.4 parts) in acetone (400 parts) was treated with 100 volume hydrogen peroxide (23 parts) in acetone (100 parts) at 0° C. The disphosphine dioxide so produced crystallised on evaporation of the solvent to about one third of the original volume of solution. It was recrystallised from hot acetone and dried in a vacuum oven at 120° C. for 3 hours to yield crystals having a melting point of 185–186° C., Yield: 75–85%.

What is claimed is:

1. In a process for the production of highly polymeric polymer by the polycondensation of polycondensable material at least 85 mole percent of which consists of at least one bis ethylene glycol ester of an aromatic dicarboxylic acid the improvement in which the polycondensation is effected in the presence as catalyst of
   (i) a trihalide or tri(pseudohalide) of antimony, and
   (ii) an organic oxo compound of phosphorus, arsenic, antimony or bismuth having an atomic number greater than 7.

2. A process according to claim 1 in which the antimony compound is antimony trifluoride.

3. A process according to claim 1 in which the oxo compound has the structure

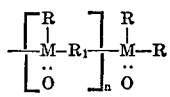

where M is a Group Va element having an atomic number greater than 7, each R is a monovalent hydrocarbyl or hydrocarbyloxy group, $R_1$ is a direct link or a divalent hydrocarbon group and $n$ is zero or one.

4. A process as claimed in claim 3 in which the oxo compound has the structure

where each R is an alkyl or alkoxy group having from 1 to 4 carbon atoms, phenyl or phenoxy, and M is phosphorus or arsenic.

5. A process as claimed in claim 3 in which the oxo compound has the structure

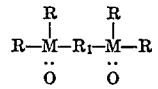

where each R is an alkyl or alkoxy group having from 1 to 4 carbon atoms, phenyl or phenoxy, $R_1$ is a direct link —$CH_2$— or —$CH_2CH_2$— and each M is phosphorus or arsenic.

6. A process as claimed in claim 1 in which the antimony compound is used in an amount of from 0.008% to 0.5% by weight of the bis ethylene glycol ester.

7. A process as claimed in claim 6 in which the antimony compound is used in an amount of from 0.02% to 0.2% by weight of the bis ethylene glycol ester.

8. A process as claimed in claim 1 in which the oxo compound is used in approximately the amount which provides two oxo oxygen atoms for each antimony atom present.

9. A process as claimed in claim 1 in which the oxo compound is added to the reagents before or during any preliminary reaction to form the bis glycol ester.

10. A process as claimed in claim 1 in which the polycondensable material consists substantially entirely of at least one bis ethylene glycol ester of an aromatic dicarboxylic acid.

11. A process as claimed in claim 1 in which the aromatic dicarboxylic acid is terephthalic acid.

12. A highly polymeric polymer prepared by the process of claim 1.

13. A process for preparing polyethylene terephthalate wherein dimethyl terephthalate is reacted with ethylene glycol to form an ester of ethylene glycol and dimethyl terephthalate or where terephthalic acid is reacted with ethylene glycol to form an ester of terephthalate acid and ethylene glycol where the resulting ester is polycondensed in the presence of a catalytic amount of a polycondensation catalyst consisting of an antimony trihalide, the improvement comprising carrying out the condensation of the ester in the presence of an arsenic compound having the formula

where each R is selected from the group consisting of a monovalent hydrocarbyl group and a monovalent hydrocarbyloxy group.

14. A process for preparing polyethylene terephthalate wherein dimethyl terephthalate is reacted with ethylene glycol to form an ester of ethylene glycol and terephthalic acid or where terephthalic acid is reacted with ethylene glycol to form an ester of terephthalic acid and ethylene glycol where the resulting ester is polycondensed in the presence of a catalytic amount of a polycondensation catalyst consisting of an antimony compound having the following formula:

wherein Y, Y' and Y" are halogen, the improvement comprising carrying out the condensation of the ester in the presence of an arsenic compound having the following formula:

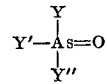

wherein Y, Y' and Y" are independently selected from the group consisting of R and OR, wherein R is independently selected from the group consisting of alkyl and aryl.

15. A polyethylene terephthalate composition comprising highly polymeric polyethylene terephthalate and in an amount sufficient to prevent color degradation of said polyethylene terephthalate (1) an antimony trihalide and (2) an arsenic compound having the formula

where each R is selected from the group consisting of a monovalent hydrocarbyl group and a monovalent hydrocarbyloxy group.

16. A novel polyethylene terephthalate composition comprising highly polymeric polyethylene terephthalate and in an amount sufficient to prevent color degradation of said polyethylene terephthalate (1) an antimony compound having the following formula:

wherein Y, Y' and Y" are halogen, and (2) an arsenic compound having the following formula:

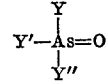

wherein Y, Y' and Y" are independently selected from the group consisting of R and OR, wherein R is independently selected from the group consisting of alkyl and aryl.

References Cited

Handbook of Chemistry and Physics, 45th Edition, 1964, published by the Chemical Rubber Co., table shown inside the back cover thereof.

DONALD E. CZAJA, Primary Examiner

R. W. GRIFFIN, Assistant Examiner

U.S. Cl. X.R.

260—75 R